United States Patent [19]

Vossoughi

[11] Patent Number: 4,776,547

[45] Date of Patent: Oct. 11, 1988

[54] PLATFORM SUPPORT AND SHUTTLE

[75] Inventor: Sohrab Vossoughi, Portland, Oreg.

[73] Assignee: Anthro Corporation, Portland, Oreg.

[21] Appl. No.: 43,382

[22] Filed: Apr. 28, 1987

[51] Int. Cl.$^4$ ............................................. F16M 11/12
[52] U.S. Cl. ..................................... 248/183; 248/188.2
[58] Field of Search ............... 248/183, 184, 185, 188, 248/188.2, 176, 424, 133, 285

[56] References Cited

U.S. PATENT DOCUMENTS 4,561,619 12/1985 Robillard et al. .................... 248/285
4,659,048 4/1987 Fahrion ................................. 248/285

FOREIGN PATENT DOCUMENTS 3003017 7/1981 Fed. Rep. of Germany ...... 248/285

Primary Examiner—Ramon O. Ramirez
Attorney, Agent, or Firm—William S. Lovell; Daniel J. Bedell

[57] ABSTRACT

A platform supporting an electronic device above a work surface, the platform being mounted on a carrier or trolley that is movable between two or more work stations on an elongate base having a track on which the trolley travels. The platform is attached to the trolley by a mounting head that provides tilt and rotation of the platform, and the height of the base above the work surface is adjustable.

8 Claims, 3 Drawing Sheets

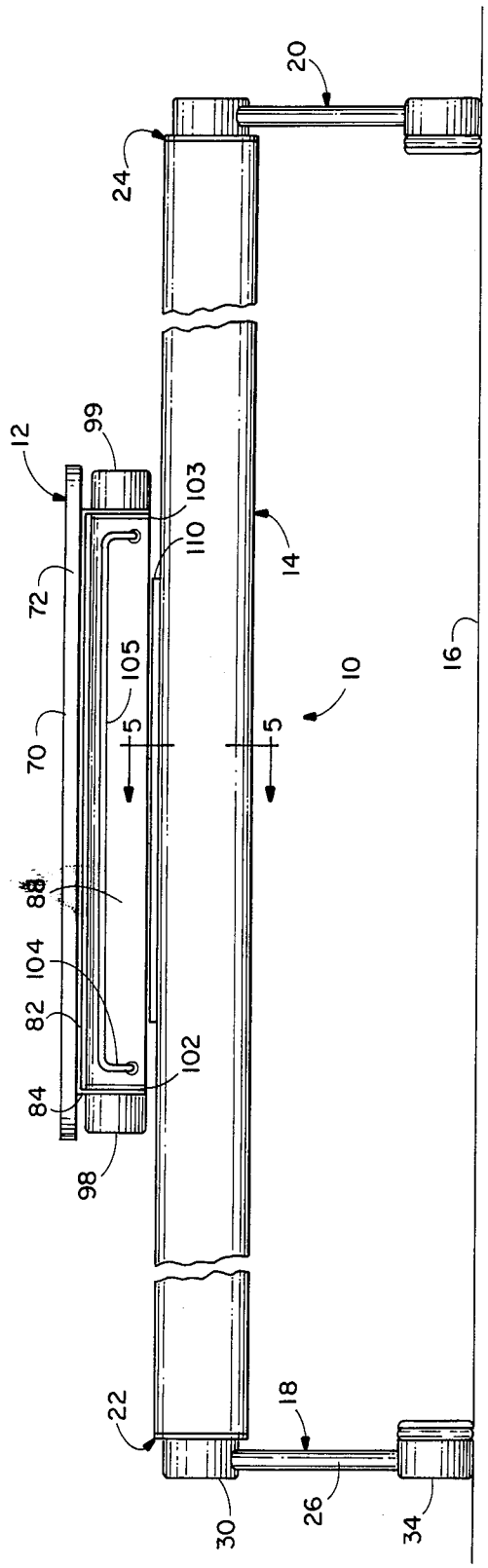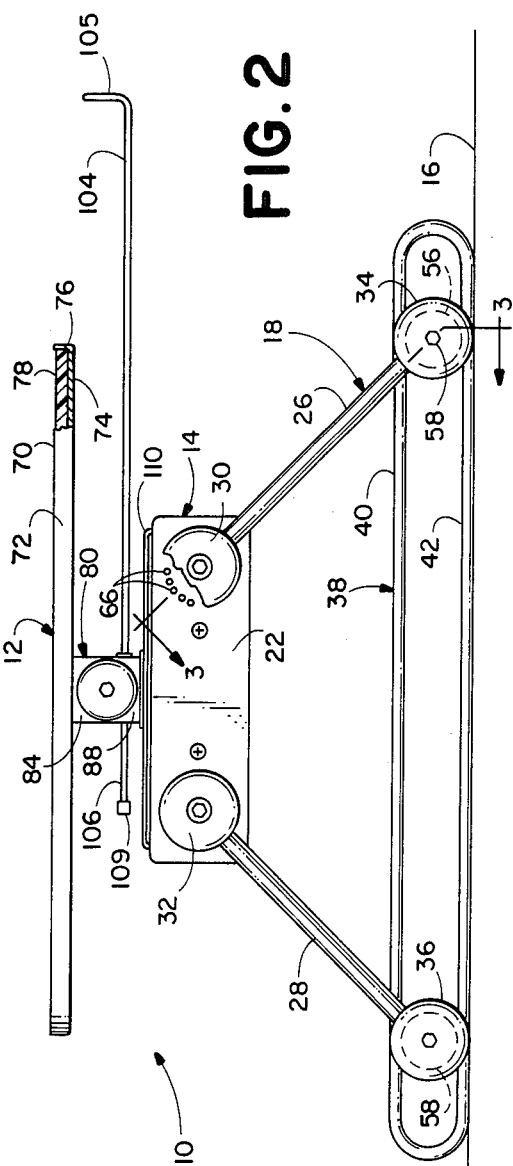

PLATFORM SUPPORT AND SHUTTLE

BACKGROUND OF THE INVENTION

This invention relates to supports, and more particularly to a slidable platform for supporting an article such as a computer terminal.

The development of small, autonomous desk-top computers, word processors and the like has given rise to a proliferation of interconnected electronic devices and computer-equipment modules in the office environment. Likewise, large computers can be time-shared by a plurality of users from work stations or video-display terminals (VDTs) located in work areas and offices remote from the main computer. Processor cabinets, keyboards, display terminals and a variety of printers and other input and output devices are often placed on desktops and work-tables, leaving a paucity of clear work area. Desk-top computers, work stations, VDTs, printers and other such modular devices may be shared by persons occupying the same room or work area; however to move such equipment from desk to desk is often inconvenient and time consuming. It is likewise inefficient and inconvenient to move workers from their assigned work station to another work station in order to utilize devices not located at their own work station. Platforms carried on an extendable arm having a swivel are used for pivoting a device from one desk to another or for moving the device away from the desk when the device is not being used; however, the distance such devices can be moved is limited by the increasing weight bearing on the platform due to leverage of the arm as it is extended.

A principal object of the instant invention is to provide an improved support for a device utilized at a desk or work station.

A more specific object of the present invention is to provide an improved support for a device utilized at a desk or work station, which support may be shuttled between work stations.

Another object of the present invention is to provide an improved movable support for a device utilized at two or more work stations.

It is another object of the instant invention to provide an improved platform for supporting a device above a work surface, which platform may be manually shuttled between two or more work stations.

Another object of the present invention is to provide an improved platform for supporting a device at a plurality of selectable heights above a work surface and including a tracked runner extending between two or more work stations, the platform being slidably movable on the runner between the work stations.

According to the instant invention there is provided a platform support and shuttle for supporting an electronic device and having an elongate base supported above a work surface and spanning at least two work stations. The platform is supported on a carrier that is movable along the base to shuttle the electronic device between the work stations.

In accordance with one embodiment of the invention, the platform is adapted for tilting and rotation so that the electronic device, for example a video display terminal, can be positioned in a selectable attitude.

In accordance with the present invention, the base is provided with a track of rails, and the carrier with wheels that set on the track. A bogie is provided to hold the carrier on the track and provide positive frictional engagement between the carrier and the base.

DRAWINGS

While the invention is set forth with particularity in the appended claims, other objects, features, the organization and method of operation of the invention will become more apparent, and the invention will best be understood by referring to the following detailed description in conjunction with the accompanying drawing in which:

FIG. 1 is a front plan view, partially cut away, of a platform support and shuttle in accordance with the instant invention;

FIG. 2 is a side plan view, partially cut away, of the platform support and shuttle shown in FIG. 1;

DESCRIPTION OF THE PREFERRED EMBODIMENT

Figure 6:
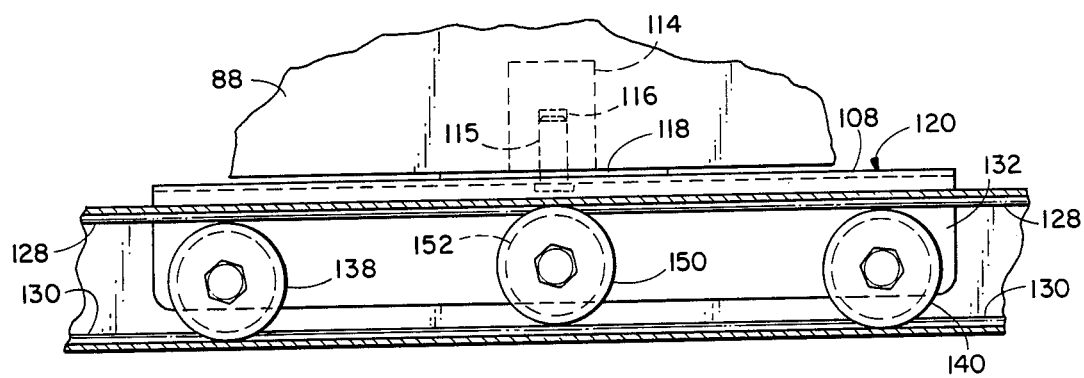
FIG. 6 is a section view taken along lines 6—6 of FIG. 5.

Referring now to the various views of the drawing for a more detailed description of the components, materials, construction, function, operation and other features of the instant invention by characters of reference, FIGS. 1 and 2 show a platform support and shuttle 10 having a platform assembly 12 slidably mounted upon an oblong shuttle runner assembly 14. The shuttle runner assembly 14 is supported at either end thereof above a surface 16 by leg assemblies 18, 20 that are attached to respective left 22 and right 24 end plates of the shuttle runner assembly 14.

The shuttle runner assembly 14 and leg assemblies 18, 20 together are symmetrical in two transverse directions about central bisecting planes, and consequently include a number of like elements. The present description, in referring to one of a plurality of such like elements, is exemplary and is applicable as well to the other such like elements not specifically referred to by characters of reference.

The leg assemblies 18, 20 are adjustable as described hereinbelow so as to raise or lower the height of the platform assembly 12 and shuttle runner assembly 14 above the surface 16. It is seen that the surface 16 may be either continuous or discontinuous, i.e., the apparatus 10 may be supported between two surfaces such as a pair of desks, or on a single extended work surface such as the surface 16 at which two or more workers may be located, each operator having access to a device carried on the shuttle 10.

Figure 3:
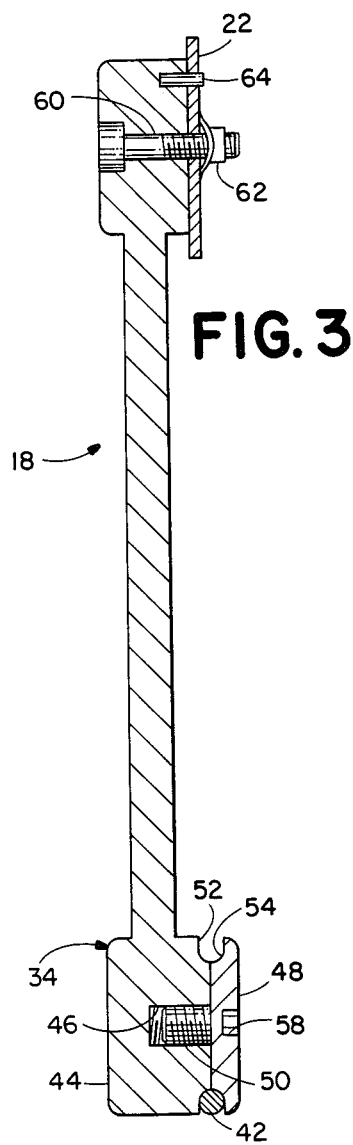
FIG. 3 is a section view taken along lines 3—3 of FIG. 2.

Referring now to FIG. 3 in conjunction with FIGS. 1 and 2, each of the leg assemblies, such as the left-hand leg assembly 18, includes a forward leg 26 and rearward leg 28 attached to and extending downward from a corresponding adjustable cylindrical knuckle 30, 32 that in turn is pivotally attached to the end plate 22 of the shuttle runner assembly 14. Each of the legs 26, 28 is attached at a distal end thereof to a corresponding foot or base knuckle 34, 36 being generally cylindrical in shape, that rests on the surface 16. A base runner 38, which is an oblong loop made of metal such as round-stock steel, includes parallel members 40, 42 extending between the pair of base knuckles 34, 36. The foot or base knuckle 34 comprises two parts, a body member 44 having a central tapped hole 46, and an adjusting cap 48 that includes a central threaded shaft 50 engaging the tapped hole 46. The body member 44 includes a peripheral groove 52 around the interior edge thereof, and the cap 48 has a similar groove 54 so that when the two members 44, 48 are joined, the grooves 52, 54 form a channel 56 that receives therein the parallel members 40, 42 of the base runner 38. The adjusting cap 48 includes a hex-head socket 58 for adjusting the tightness with which the members 44, 48 grip the base runner 38.

Each of the adjustable cylindrical knuckles such as the knuckle 30 is attached to the end plate 22 by means of a centrally disposed threaded fastener 60 that is engaged in a nut plate 62 affixed interiorly of the end plate 22. A metal pin 64 affixed in the knuckle 30 protrudes therefrom and is insertable into one of five holes 66 drilled in the end plate 22 in a circular locus about the axis of the knuckle 30, the holes 66 and the pin 64 serving as a five-position detent for adjusting the height of the shuttle runner assembly 14 above the surface 16. The height of the platform can be adjusted by loosening each of the knuckles and repositioning the legs so that each of the pins 64 is received in a corresponding one the end-plate holes 66. After positioning all four of the legs at the same position relative to a single surface 16, the knuckles are tightened to retain the shuttle runner assembly 14 in a substantially horizontal attitude at a selected height above the surface 16. Five different heights of the platform are provided in the presently described embodiment of the invention, in increments of about 2.5 centimeters (1 inch), from 8–18 centimeters (3–7 inches) above the surface 16. When the platform support and shuttle 10 is supported on two work surfaces of unequal height, the leg assemblies can each be adjusted so that the shuttle runner assembly 14 is in a substantially horizontal attitude above the surfaces.

The platform assembly 12 supports a device (not shown) such as a computer terminal on a surface 70 of a platform 72. The platform 72 may be made from any suitable material such as wood, pressed board or metal, the preferred embodiment being a sheet metal tray 74 having an upwardly extending peripheral lip 76 formed therein as by stamping, the tray 74 subtending a pad 78 that forms the surface 70. The pad 78 is suitably made of a non-skid material such as rubber so that a device resting on the platform 72 will tend to hold fast to the surface 70 when the platform is tilted as described hereinbelow. The lip 76 may extend slightly above the surface 70 of the pad 78 to serve as a stop should the supported device inadvertently slip when the platform 72 is tilted.

Figure 4:
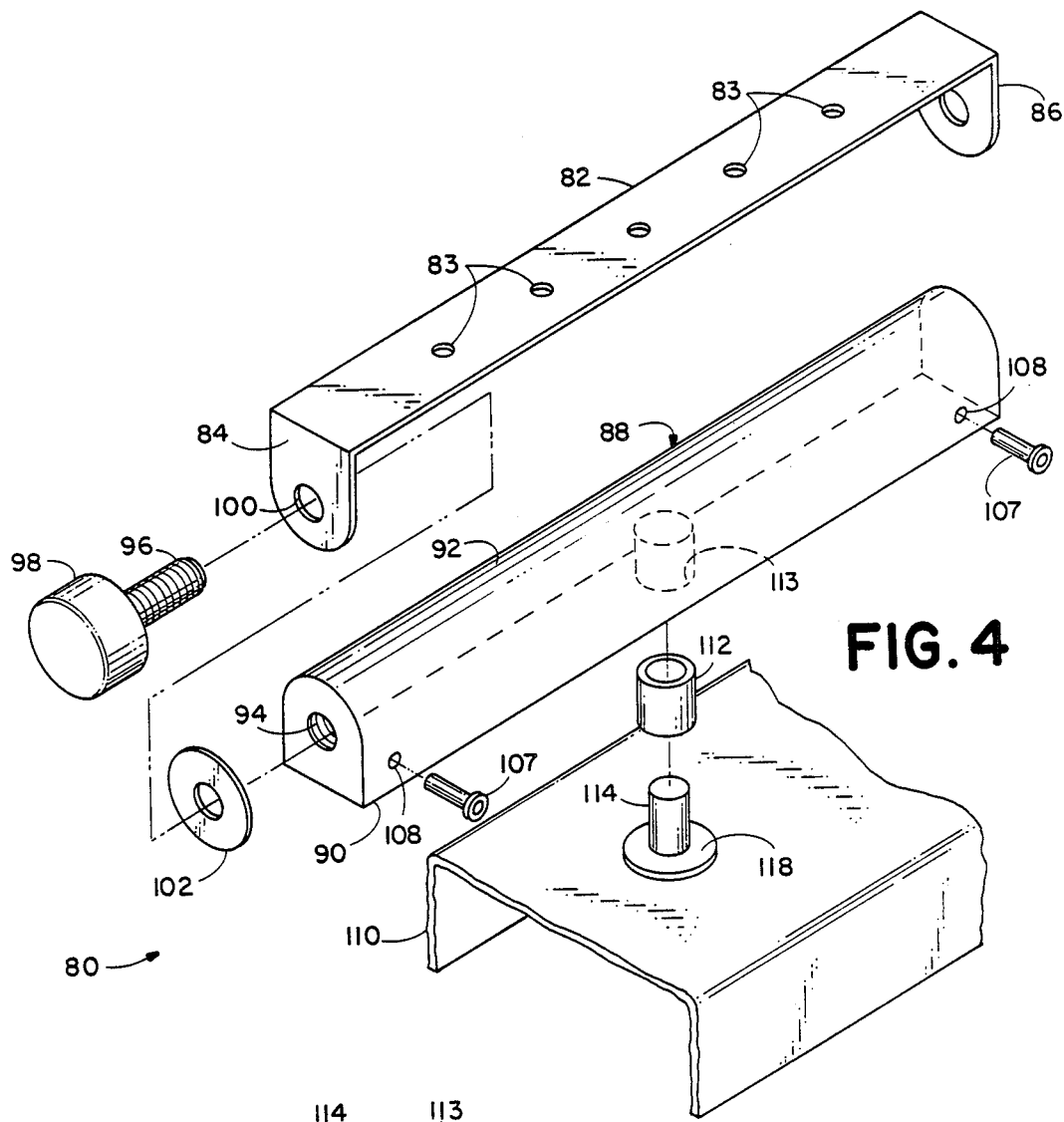
FIG. 4 is an exploded view of the rotatable tilt-head assembly of FIGS. 1 and 2.

Referring to FIG. 4 in conjunction with FIGS. 1 and 2, the metal tray 74 of the platform 72 is attached to a tilt head 80 that includes a metal tilt bracket 82, to which the platform 72 is affixed as by countersunk flat-headed machine screws (not shown) through apertures 83. The tilt bracket 82 extends substantially the width of the platform 72 and is bent downward at ends 84, 86 thereof for attachment to a rotatable base member 88 of the tilt head 80. The base 88, an oblong member having a rectangular underside 90 and a semicylindrical crown portion 92, is suitably formed from aluminum square stock or cast aluminum and includes a tapped hole 94 in either end thereof receiving a threaded fastener 96 that protrudes from a tilt knob 98. The fastener 96 passes through an aperture 100 in the end 84 of the tilt bracket 82 and a washer 102 held between the end 84 of the tilt bracket 82 and the base member 88. The tilt knobs 98, 99 are threaded into the base member 88, and may be adjusted to develop the degree of friction necessary to accommodate the weight of a particular computer terminal. Thereafter, the tilt of platform 72 may be freely adjusted as desired and will maintain such a position. The washers 102, 103 are suitably made from a resilient thermoplastic material having a low coefficient of static friction such as acetyl homopolymer, which is sold under the trade name of Delrin.

A slidable metal rack or tray 104 formed in a U-shaped configuration extends outwardly in cantilever fashion from the base member 88. The rack 104 can be stored in a retracted position under the platform 72, or pulled outwardly from the base member 88 to extend beyond the edge of the platform 72 for the purpose of supporting a device such as a keyboard (not shown) adjacent to and below the level of the platform 72. A transverse member 105 of the U-shaped rack 104 is bent upward to serve as a retainer or stop that holds the keyboard on the rack. The rack 104 is suitably made from stainless steel round stock bent into the U-shaped configuration, ends 106 of the rack extending through and frictionally engaged in nylon bushings 107 that are pressed into holes 108 drilled through the base member 88 of the tilt head 80. A cap 109 of any suitable material such as plastic is pressed onto ends 106 of the rack that project from the base member 88 to prevent the rack from being pulled loose from the base member 88.

Figure 5:
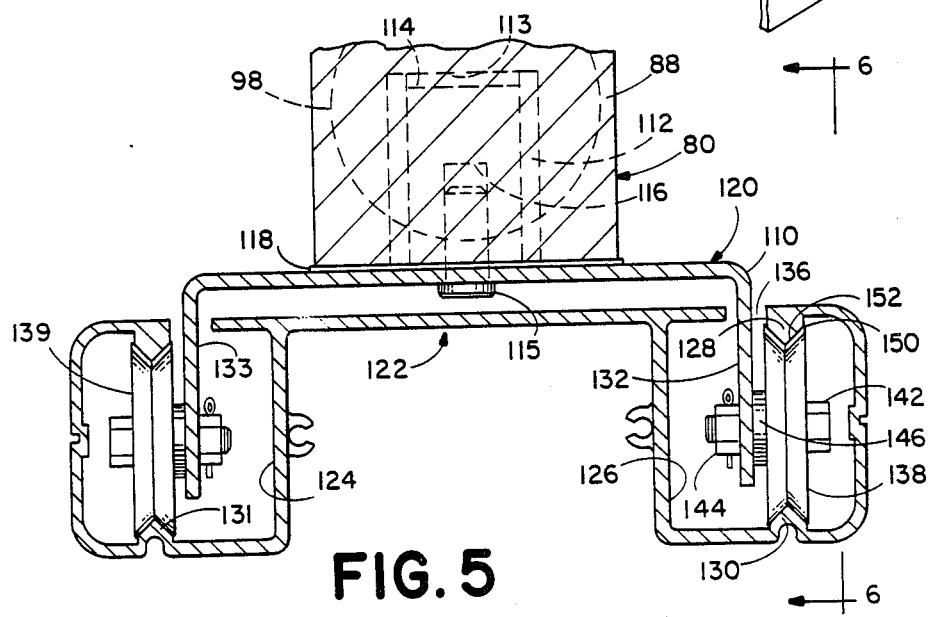
FIG. 5 is a section view taken along lines 5—5 of FIG. 1.

With reference to FIG. 5, the tilt head 80 and the platform 72 attached thereto are supported upon and horizontally rotatable with respect to a shuttle bracket 110 of the shuttle runner assembly 14. A sleeve 112 that may suitably be a bushing made of brass is pressed into a central cylindrical aperture 113 formed in the underside of the base member 88. A vertically disposed pivot 114 is attached to the shuttle bracket 110 by way of a machine screw 115 threaded into a tapped hole 116 in the underside of the pivot 114, the pivot 114 being received into the sleeve 112 when the tilt head 80 is supported on the shuttle bracket 110. A swivel washer 118 is disposed in the interstice between the underside of the rotatable base member 88 and the shuttle bracket 110, and is held affixed to the shuttle bracket by the pivot 114. The washer 118, which is preferably made of acetyl homopolymer, holds the base member 88 spaced apart from the shuttle bracket 110 and provides a bearing surface on which the base member 88 rests slidably as the tilt head 80 and platform 72 rotate about the vertical axis of the pivot 114.

While the base member 88 is described herein as being made from a solid piece of metal, it may also be formed from sheet metal into a similar configuration with the constituent elements thereof being attached thereto by any suitable means such as welding. For example, the bushing 112, instead of being pressed into the aperture 113 of the solid base member 88, can be welded interiorly of the underside 90 of a sheet metal base 88, with suitable gussets added for strength.

Referring now to FIGS. 1, 5 and 6, the shuttle runner assembly 14 comprises a carrier or trolley 120 that is movable longitudinally with respect to a carrier housing 122. The carrier housing 122 comprises an oblong extrusion of aluminum having parallel channels 124, 126, each comprising a runner that slidably supports the trolley 120 and including an upper rail 128 and a lower rail 130 vertically juxtaposed interiorly of the channel 126, the rails 128, 130 extending substantially the length of the channel. The shuttle bracket 110, which is suitably made from sheet metal, forms the body of the trolley 120 and includes downwardly extending side members or flanges 132 depending from the substantially horizontal and planar central member of the shuttle bracket 110. The upper rail 128 of the channel 126 is adjacent to a longitudinal slot 136 in the channel 126 through which the downwardly projecting flange 132 of the shuttle bracket extends into the channel 126. Grooved wheels 138-140 attached to the downwardly extending flanges 132, 133 proximate each of the four corners of the trolley 120 support the trolley 120 on the lower rails 130, 131 of the carrier housing 122, the lower rails forming a track on which the carrier or trolley 12 rides. The wheels 138-140 are rotatably attached to the flange by any suitable means such as an axle bolt 142 and captive nut 144, a washer 146 spacing the wheel 138 apart from the flange 132. A grooved wheel or bogie 150 centrally disposed between the outer wheels 138, 140 is similarly attached to the flange 132 but in a vertical position slightly raised with respect to the outer wheels 138, 140 so that the groove 152 of the central wheel 150 rides on the upper rail 128 of the carrier housing 122. The central and outer wheels thus provide a positive frictional and rolling engagement of the trolley 120 with both the upper and lower rails of the carrier housing 122, the upper wheel or bogie 150 preventing the trolley from lifting off the lower rails. A "bogie" is defined herein as a rolling or sliding restraint attached to apparatus motive along a surface, which restraint bears on a structure extrinsic of the apparatus and opposes forces opposite to forces such as gravity that act upon the apparatus and tend to hold the apparatus on the surface. The grooved wheels 138-140, 150 are suitably formed from a thermoplastic material such as nylon.

The carrier or trolley 120 may thus be shuttled easily by hand along the carrier housing 122 to reposition the device carried on the platform 72 to another work station. The positive frictional engagement of the trolley 120 between the upper and lower rails provided by the offset wheels ensures that the trolley will stop immediately, without rolling freely, when the trolley is released.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. A platform support and shuttle, comprising:
    an elongate base having first and second ends;
    means attached to each end of said elongate base for supporting said base in a substantially horizontal attitude above at least one work surface, said elongate base having a length that spans at least two work stations;
    a carrier, said base including means for slidably supporting said carrier;
    a platform adapted to support an electronic device for use at one of the work stations;
    means for supporting said platform on said carrier including means for tilting said platform around a horizontal axis parallel to said platform, said carrier being movable along said base to shuttle the electronic device between the work stations.

2. A platform support and shuttle according to claim 1 wherein said platform supporting means includes means for rotating said platform about a vertical axis.

3. A platform support and shuttle according to claim 1 wherein said means for supporting said base comprises adjustable legs supporting said base at selectable heights above said work surface.

4. A platform support and shuttle according to claim 1 wherein said means for slidably supporting said carrier comprises a track of parallel rails extending substantially between the ends of said elongate base, said carrier having wheels rotatably attached thereto and riding on said track.

5. A platform support and shuttle according to claim 4 wherein said track includes a downwardly facing rail, and said carrier includes a bogie contacting said downwardly facing rail.

6. A platform support and shuttle according to claim 1 wherein said means for supporting said platform on said carrier includes a mount having a swivel with a substantially vertical axis, said platform being rotatably with respect to said carrier about said vertical axis.

7. A platform support and shuttle according to claim 6 wherein said mount includes a tilt member attached to said platform, said tilt member having a horizontal axis of tilt, said platform being tiltable with respect to said carrier about said horizontal axis.

8. A platform support and shuttle, comprising:
    an elongate base having first and second ends, said elongate base having a length that spans at least two work stations and including a track of rails extending substantially the length of said base;
    a pair of adjustable legs pivotally attached to each of the first and second ends of said elongate base, said legs supporting said elongate base in a substantially horizontal attitude above at least one work surface, each of said legs being slidably attached at a distal end thereof to a runner resting on the surface, each said pair of legs forming the sides of a trapezoid with the corresponding runner and the end of said elongate base;
    a carrier supported on said elongate base and adapted for translation along said elongate base, said carrier including a set of wheels rotatably attached to said carrier, each of said wheels having a peripheral groove engaged with said track,
    a bogie attached to said carrier and engaged with said elongate base, and
    a pivot attached to said carrier and having a substantially vertical axis;
    a mounting head including
        an elongate base member having a central longitudinal axis and being centrally supported on the pivot of said carrier with the central longitudinal axis being substantially horizontally disposed, said elongate base member being rotatable about the vertical axis of the pivot,
        a U-shaped tilt bracket having a horizontally disposed central member and legs rotatably attached to distal ends of said elongate base member at the central longitudinal axis of said elongate base member, the central member of said U-shaped tilt bracket being adapted for tilting rotation about the central longitudinal axis of said elongate base member;

a platform attached to the horizontally disposed central member of said U-shaped tilt bracket, said platform being adapted to support an electronic device for use at one of the work stations, said carrier being movable along said track to shuttle the electronic device between the work stations.

* * * * *